United States Patent [19]
Swanson et al.

[11] Patent Number: 5,338,153

[45] Date of Patent: Aug. 16, 1994

[54] NON-DRIP FLUID CIRCULATING PUMP

[75] Inventors: Victor E. Swanson, Peoria; Joel D. Feucht, Morton; Stephen G. Shoup, Peoria, all of Ill.

[73] Assignee: Caterpillar Inc., Peoria, Ill.

[21] Appl. No.: 86,272

[22] Filed: Jun. 30, 1993

[51] Int. Cl.$^5$ .............................................. F04D 29/00
[52] U.S. Cl. ............................ 415/168.2; 417/423.11
[58] Field of Search .......................... 417/423.11, 374; 415/168.1, 168.2, 201, 118

[56] References Cited

U.S. PATENT DOCUMENTS

| | | | |
|---|---|---|---|
| 5,154,576 | 10/1992 | Dorski et al. | 417/423.11 |
| 5,226,786 | 7/1993 | Dorski et al. | 415/168.2 |

FOREIGN PATENT DOCUMENTS

| | | | |
|---|---|---|---|
| 0231279 | 1/1964 | Austria | 417/423.11 |
| 0481968 | 8/1929 | Fed. Rep. of Germany | 417/423.11 |
| 0512339 | 9/1939 | United Kingdom | 415/168.1 |
| 84/04368 | 11/1984 | World Int. Prop. O. | 415/168.2 |

*Primary Examiner*—Edward K. Look
*Assistant Examiner*—Mark Sgantzos
*Attorney, Agent, or Firm*—Diana L. Charlton

[57] ABSTRACT

The design and construction of past fluid circulating pumps, having a weep hole, allowed small amounts of leaked fluid to escape through the weep hole and into the atmosphere resulting in environmental concern and lower customer perception of the product. The present invention overcomes these problems by providing a fluid circulating pump utilizing a plug means sealingly disposed within a weep hole located in a secondary compartment of a cavity. The plug means is sealingly disposed within the weep hole and has a tube portion extending a predetermined length into the secondary compartment. The length of the tube portion is sufficient to contain the leaked fluid within the secondary compartment until it can be evaporated, substantially eliminating fluid leakage into the atmosphere. However, excessive fluid build-up may occur within the secondary compartment when the pump is damaged. The present invention allows the excessive fluid to leak out to the atmosphere through a bore in the plug means to signal that pump repair is needed.

9 Claims, 3 Drawing Sheets

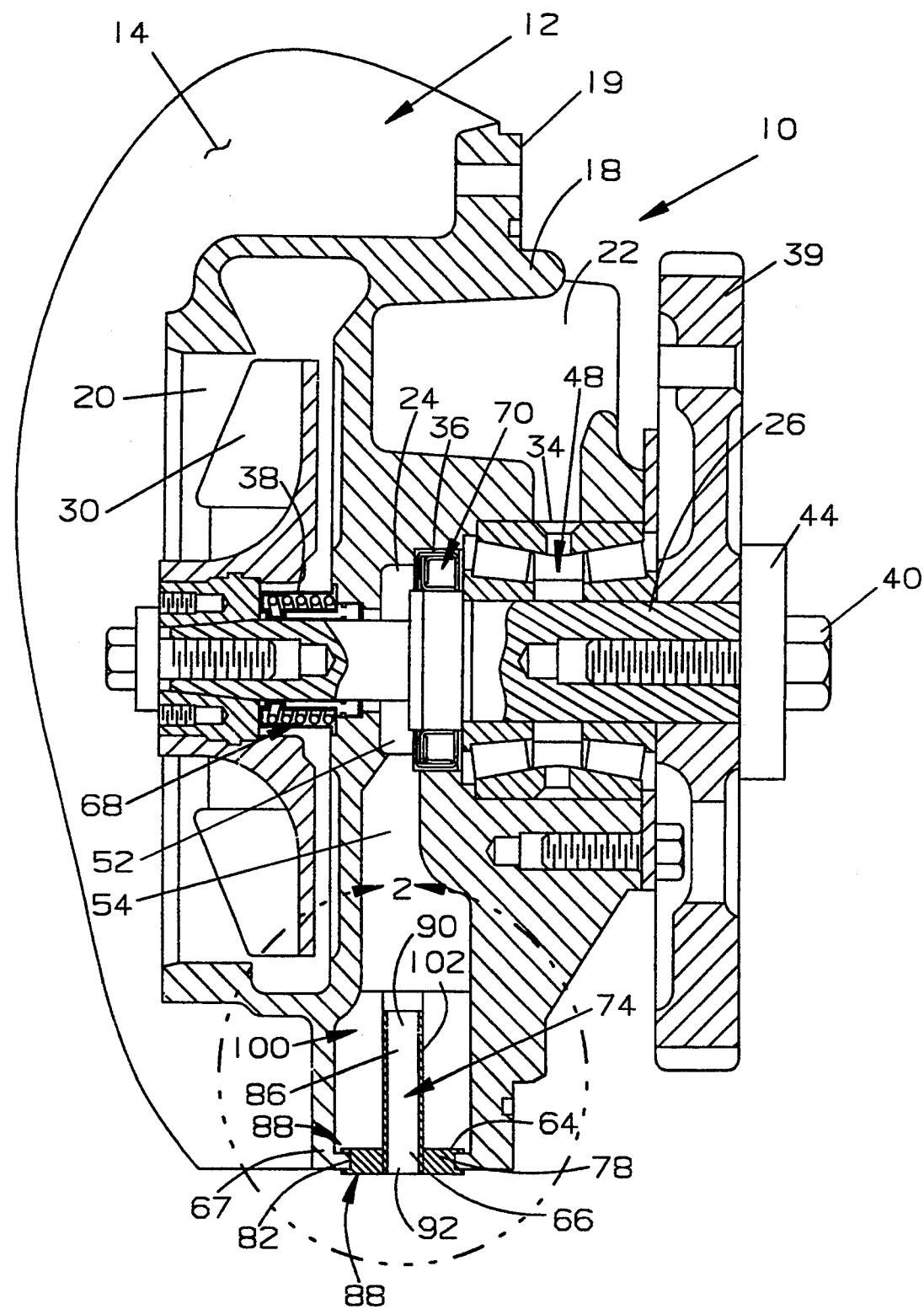
Fig_1_

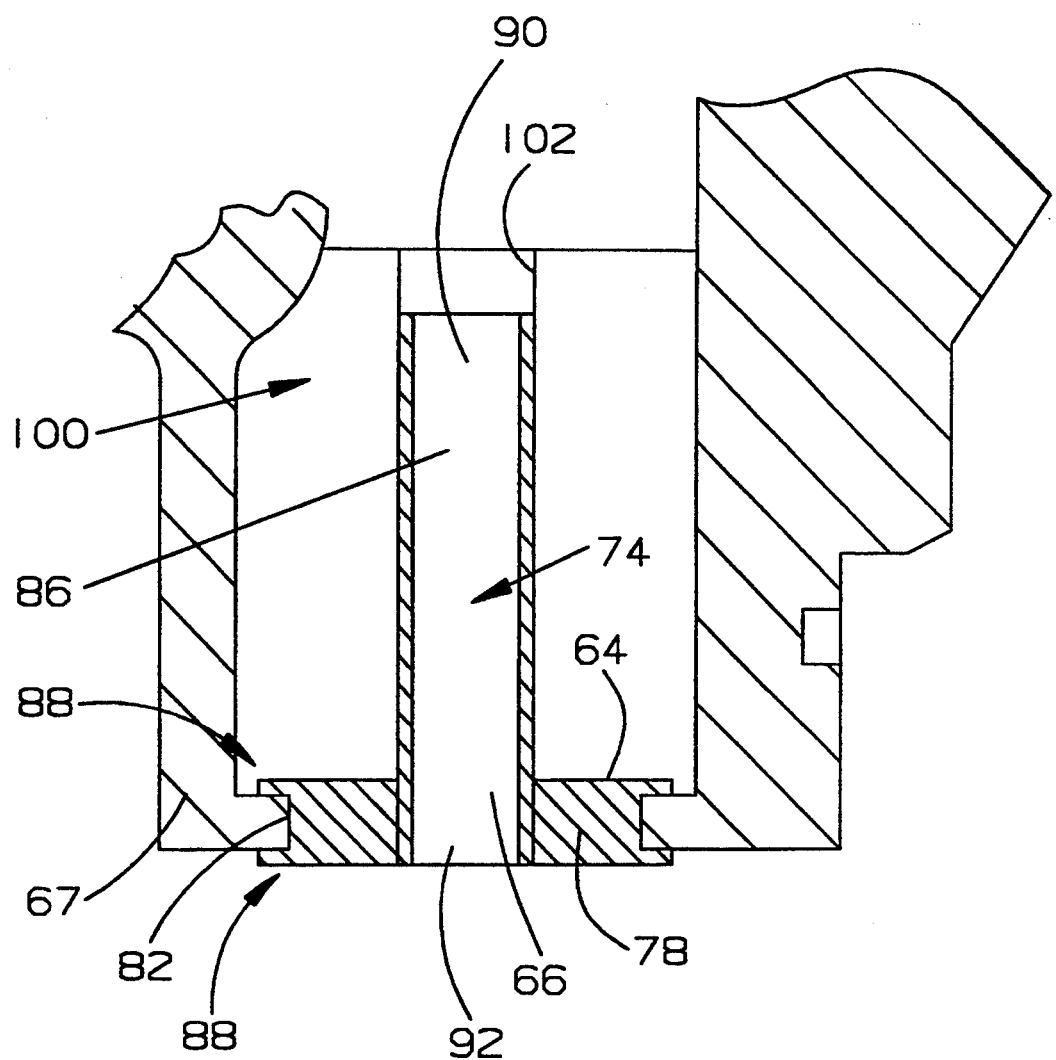
Fig_2_

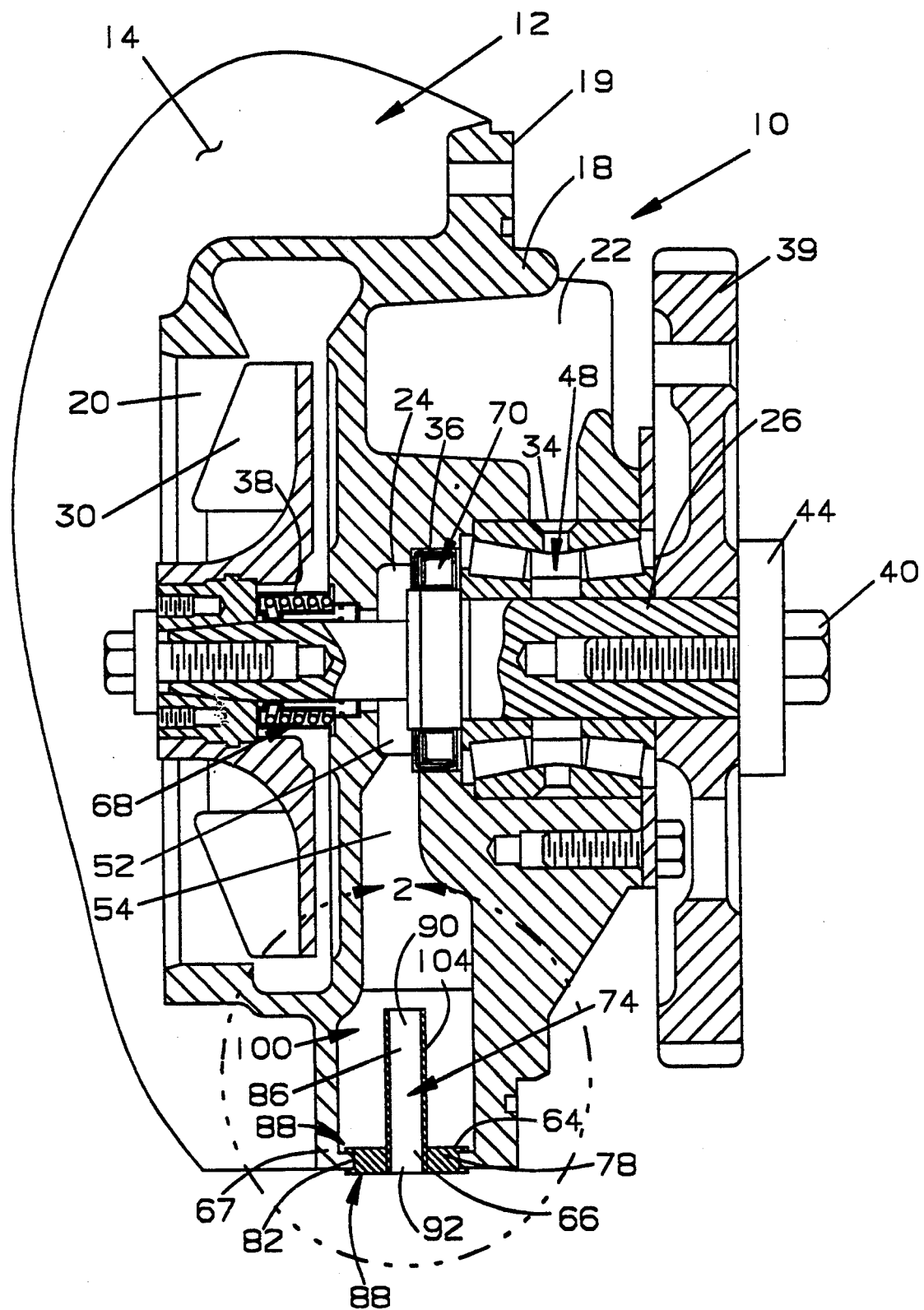
Fig_3

NON-DRIP FLUID CIRCULATING PUMP

TECHNICAL FIELD

This invention relates generally to a fluid circulating pump for use in an internal combustion engine and more particularly to the substantial elimination of dripping leaked fluid into the environment.

BACKGROUND ART

Present day engines are being manufactured to meet or exceed stringent environmental standards in order to preserve the world in which we live. Engine improvements are constantly being made in an effort to accomplish this goal. It is for this reason that engine components, such as pumps, are being manufactured to minimize or eliminate fluid leakage into the environment.

The cooling fluid circulating pump for most internal combustion engines has a shaft rotatably mounted within a pump housing. A coolant seal assembly surrounds the shaft to substantially isolate a first housing chamber containing coolant from an intermediate housing chamber. A second housing chamber contains an oil lubricated bearing assembly and is isolated from the intermediate housing chamber by a secondary seal assembly. An impeller is attached to the end of the shaft and is located within the first housing chamber. During operation, as the impeller rotates to circulate cooling fluid within the engine, coolant invariably leaks around the coolant seal assembly and into the intermediate housing chamber due to the nature of the seal. A weep hole, which is open to the atmosphere, is provided in the intermediate housing chamber so that the leaked coolant may escape from the pump housing without contaminating the oil or damaging the bearing assembly within the second housing chamber. Unfortunately, coolant in varying amounts is leaked into the atmosphere causing environmental concern and lower customer perception of the product.

The present invention provides an inexpensive design to minimize or substantially eliminate leaked fluid from dripping from a pump. The present invention is therefore directed to overcome one or more of the problems as set forth above.

DISCLOSURE OF THE INVENTION

In one aspect of the present invention a fluid circulating pump adapted for use in an internal combustion engine includes a housing which has a fluid chamber and a cavity. A shaft is rotatably mounted within the housing and extends through the cavity and terminates in the fluid chamber. A seal assembly surrounds the shaft to substantially isolate the fluid chamber from the cavity. The cavity has an open end communicating with the atmosphere. A plug means is sealingly disposed within the open end of the cavity for restricting fluid from escaping into the atmosphere.

The disadvantage of the prior art is that they fail to provide a means for minimizing or eliminating small amounts of leaked fluid from dripping from the pump to the atmosphere. The present invention, through the use of a plug means within an open end of a cavity substantially eliminates leaked fluid from dripping from the pump.

BRIEF DESCRIPTION OF THE DRAWINGS

FIG. 1 is a diagrammatic section view of an embodiment of the present invention.

FIG. 2 is a detail view of the area of FIG. 1 encircled by line 2.

FIG. 3 is a diagrammatic section view of an alternative embodiment of the present invention.

BEST MODE FOR CARRYING OUT THE INVENTION

A cooling fluid circulating pump 10 for an internal combustion engine 12 having a conventional cylinder block 14 is shown in FIGS. 1 and 2. The circulating pump 10 is conventionally mounted to the cylinder block 14 in any suitable manner. The circulating pump 10 pumps coolant through a cooling system (not shown) having a radiator (not shown) and includes a housing 18 having an outer wall 19. The housing 18 defines a first fluid chamber 20, a second fluid chamber 22, and an intermediate cavity 24. A shaft 26 is rotatably mounted within the housing 18 and extends through the cavity 24 and into the first fluid chamber 20. An impeller 30 is located within the first fluid chamber 20 and is mounted to the shaft 26 for rotation therewith. The housing 18 defines first 34, second 36, and third 38 axially aligned bores. A gear 39 is conventionally driven, such as by a crankshaft (not shown), and fastened by a bolt 40 and washer 44 to the shaft 26. A bearing assembly 48 is disposed within the first bore 34 of the housing 18 for rotatably supporting the shaft 26.

The first fluid chamber 20 contains and circulates cooling system coolant by means of the impeller 30 located within the chamber 20. The cavity 24 defines a primary compartment 52 in surrounding relation to the shaft 26 and a secondary compartment 54. The secondary compartment 54 extends outwardly from the primary compartment 52 and terminates at an annular shoulder 64. The outer wall 19 of the housing 18 defines an open end 66, such as a weep hole, therethrough extending into the secondary compartment 54 and communicating with the atmosphere. The diameter of the weep hole 66 is smaller than the diameter of the secondary compartment 54 defining a flange 67 on the outer wall 19 of the housing 18.

A coolant seal assembly 68 of any suitable type is disposed within the third bore 38 in sealing engagement with the shaft 26 to substantially sealingly isolate the first fluid chamber 20 from the primary compartment 52. An oil seal assembly 70 of any suitable type is disposed within the second bore 36 in sealing engagement with the shaft 26 to substantially sealingly isolate the primary compartment 52 from the bearing assembly 48.

A plug means 74, such as a rubber stopper, is sealingly disposed within the weep hole 66 for restricting coolant from escaping into the atmosphere. The plug means 74 has a cylindrical head portion 78 which has an annular groove 82 in which the flange 67 is seated and a tube portion 86. The annular groove 82 defines a pair of lips 88. One of the pair of lips 88 is seated against the annular shoulder 64 and the other of the pair of lips 88 is seated against the outer wall 19 of the housing 18. The tube portion 86 extends from the head portion 78 and terminates a predetermined length into the secondary compartment 54. A bore 90 is disposed through the tube portion 86 and the head portion 78 to form an opening 92 which communicates with the atmosphere.

A means 100 for absorbing coolant, such as a sponge, is located within the secondary compartment 54 and has a cylindrical shape with a length greater than the length of the tube portion 86. The absorbing means 100 has a pilot bore 102 therethrough which surrounds the tube portion 86.

Another embodiment of the present invention is shown in FIG. 3. It should be noted that the same reference numerals of the first embodiment are used to designate similarly constructed counterpart elements of the embodiment.

In this embodiment, the means 100 for absorbing coolant has a pilot bore 104 with a length substantially equal to the length of the tube portion 86. Since the pilot bore 104 does not go entirely through the absorbing means 100, a portion of the absorbing means 100 covers the top of the bore 90 in the plug means 74. The covering of the bore 90 protects the seal assemblies 68,70 from contaminates, such as dirt, which may enter the cavity 24 through the weep hole 66.

INDUSTRIAL APPLICABILITY

In use, coolant is circulated by the impeller throughout the cooling system of the internal combustion engine 12 to cool the engine 12. Due to the nature of the coolant seal assembly 68, coolant within the fluid chamber 20 may leak around the coolant seal assembly 68 and into the cavity 24.

Leaked coolant now within the cavity 24 flows toward the outer wall 19 of the housing 18 and into the absorbing means 100 within the secondary compartment 54. The coolant is absorbed by the absorbing means 100 and is slowly evaporated by air circulating within the secondary compartment 54.

Coolant saturation of the absorbing means 100 may cause deterioration of or leakage from the absorbing means 100. In this event, however, the head portion 78 of the plug means 74 seals the weep hole 66 so that any coolant not contained within the absorbing means 100 may not leak out into the atmosphere. The tube portion 86 of the plug means 74 has a length sufficient to contain the unabsorbed coolant within the secondary compartment 54 until it is slowly evaporated by the air circulating within the secondary compartment 54.

Major coolant pump leakage, such as that brought about by coolant seal assembly failure, must be visible so that the pump may be repaired. The bore 90 in the plug means 100 allows the excessive coolant from a major leak to escape out to the atmosphere. This is necessary not only to alert the customer of necessary repair work, but additionally, restricts coolant from entering the oil seal assembly 70 and damaging the bearing assembly 48 in the pump 10.

It should be understood that the plug means 74 could be used separately without the use of the absorbing means 100 to achieve similar results as that of the described invention. Furthermore, it should be understood that although the pilot bore 102,104 of the absorbing means 100 is shown surrounding the tube portion 86, the pilot bore 102,104 may be removed so that the absorbing means 100 would not surround the tube portion 86. The absorbing means 100 could be positioned above the tube portion 86 to cover the top of the bore 90 or disposed within the tube portion 86 without changing the scope of the invention.

In view of the above, it is apparent that the present invention provides an improved means to substantially eliminate the dripping of leaked coolant from a fluid circulating pump into the atmosphere. The present invention utilizes a plug means within a secondary compartment which seals an open end leading to the atmosphere. Leaked coolant is absorbed by an absorbing means surrounding the plug means while it is continuously being evaporated by air circulation within the secondary compartment. When the absorbing means becomes saturated, a tube portion of the plug means contains the coolant within the secondary compartment while it is slowly evaporated.

We claim:
1. A fluid circulating pump, comprising:
   a housing having a fluid chamber and a cavity;
   a shaft rotatably mounted within the housing and extending through the cavity and terminating in the fluid chamber; an impeller mounted to the shaft for rotation therewith
   a seal assembly in surrounding relation to the shaft to substantially isolate the fluid chamber from the cavity;
   the cavity having an open end communicating with the atmosphere; and
   plug means substantially disposed within the cavity for restricting fluid from escaping into the atmosphere, the plug means being in sealing engagement with the housing at the open end.

2. The fluid circulating pump of claim 11, wherein the plug means has a cylindrical head portion and a tube portion extending from the head portion and terminating a predetermined length into the cavity, the plug means having a bore therethrough.

3. The fluid circulating pump of claim 2, including means having a pilot bore in surrounding relation to the tube portion for absorbing fluid within the cavity, the absorbing means having a predetermined length greater than the length of the tube portion.

4. The fluid circulating pump of claim 3, wherein the pilot bore has a length equal to the length of the tube portion.

5. The fluid circulating pump of claim 3, wherein the pilot bore has a length equal to the length of the absorbing means.

6. A fluid circulating pump, comprising: a housing having a fluid chamber and a cavity;
   a shaft rotatably mounted within the housing and extending through the cavity and terminating in the fluid chamber; an impeller mounted to the shaft for rotation therewith
   a seal assembly in surrounding relation to the shaft to substantially isolate the fluid chamber from the cavity;
   the cavity having an open end communicating with the atmosphere, a primary compartment in surrounding relation to the shaft, and a secondary compartment fluidly communicating with and extending outwardly from the primary compartment and terminating at an annular shoulder in close proximity to the open end;
   plug means sealingly disposed within the cavity for restricting fluid from escaping into the atmosphere; and
   the plug means having a cylindrical head portion including an annular groove circumferentially therein and a tube portion extending from the head portion and terminating a predetermined length into the secondary compartment, the plug means having a bore therethrough.

7. The fluid circulating pump of claim 6, including means having a pilot bore in surrounding relation to the tube portion for absorbing fluid within the secondary compartment, the absorbing means having a predetermined length greater than the length of the tube portion.

8. The fluid circulating pump of claim 7, wherein the pilot bore has a length equal to the length of the tube portion.

9. The fluid circulating pump of claim 7, wherein the pilot bore has a length equal to the length of the absorbing means.

* * * * *

UNITED STATES PATENT AND TRADEMARK OFFICE
CERTIFICATE OF CORRECTION

PATENT NO. : 5,338,153

DATED : August 16, 1994

INVENTOR(S) : VICTOR E. SWANSON ET AL.

It is certified that error appears in the above-identified patent and that said Letters Patent is hereby corrected as shown below:

Claim 2, column 4, line 28 "11" should be --1--.

Signed and Sealed this

Twenty-ninth Day of November, 1994

Attest:

BRUCE LEHMAN

*Attesting Officer*     *Commissioner of Patents and Trademarks*